Sept. 18, 1934.     E. R. MORTON     1,974,082
REGULATOR SYSTEM
Filed Oct. 12, 1933
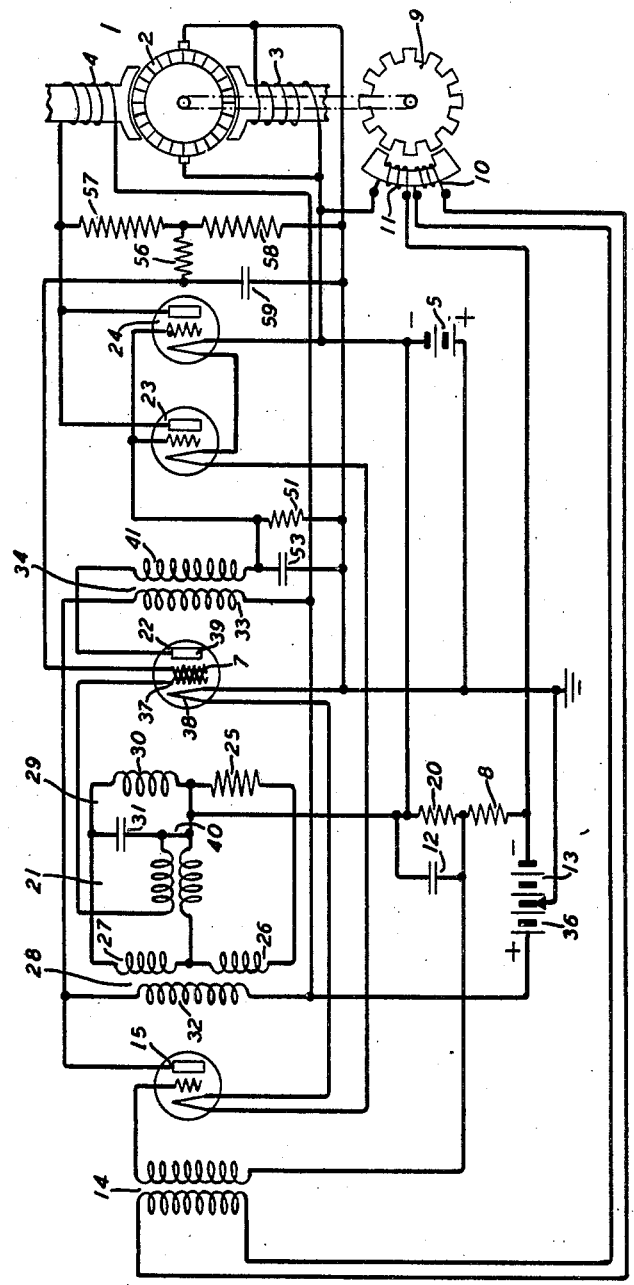
INVENTOR
E. R. MORTON
BY Wayne B Wells
ATTORNEY Patented Sept. 18, 1934

1,974,082

UNITED STATES PATENT OFFICE 1,974,082

REGULATOR SYSTEM

Edmund R. Morton, New York, N. Y., assignor to Bell Telephone Laboratories, Incorporated, New York, N. Y., a corporation of New York Application October 12, 1933, Serial No. 693,250

16 Claims. (Cl. 171—119)

This invention relates to regulator systems and particularly to compensating circuits for motor speed regulator systems.

One object of the invention is to provide a regulator system with auxiliary circuits that shall compensate the regulating operation in an improved manner.

Another object of the invention is to provide a motor speed regulator system having a coplanar space discharge device that shall be compensated according to the load on the motor.

Another object of the invention is to provide a motor speed regulator system having a coplanar space discharge device that shall be compensated according to the load on the motor in a manner to prevent any hunting action.

A further object of the invention is to provide a motor regulator system having a coplanar space discharge device controlled to maintain the motor speed substantially constant with auxiliary circuits that shall act on the auxiliary grid of the coplanar device to compensate the regulating operation according to the load on the motor and in a manner to prevent hunting action.

In the motor speed regulator system shown in the E. R. Morton Patent No. 1,788,733, dated January 13, 1931 provision is made for maintaining the speed of a motor substantially constant with high precision notwithstanding supply circuit voltage changes if the motor is only subjected to small load changes. The present invention provides means for compensating a regulator system of the type shown in the Morton patent for motor load changes. A delay is provided in the operation of the compensating means to insure against hunting action.

The system employed to disclose the invention comprises a motor having a regulating field winding. The motor is directly connected to a pilot generator which develops a current having the frequency varying according to the motor speed. The current from the pilot generator is supplied to a space discharge amplifier having a limited power output. The output circuit of the amplifier of limited power output is connected to two opposite vertices of a Wheatstone bridge circuit and to the plate circuit of a phase detector tube. The Wheatstone bridge circuit is provided with one arm in the form of a resonant circuit which is tuned to the frequency of the pilot generator when the motor is operating at normal speed.

The phase detector tube preferably comprises a four-element coplanar space discharge device. The input circuit of the phase detector tube comprising the control grid is connected to the output vertices of the Wheatstone bridge circuit. The control grid is thus supplied with an alternating potential which varies in phase relation with respect to the alternating potential impressed on the plate according to the variations in speed of the motor. Accordingly, the output from the phase detector tube varies according to the variations in speed of the motor. The phase detector tube is coupled to two regulator amplifier tubes by means of a resistance element shunted by a condenser. The condenser shunted across the coupling resistance serves to control the Wheatstone bridge circuit so as to stabilize the regulating operation and prevent hunting action. The power required for charging the condenser changes the voltage supplied to the Wheatstone bridge circuit. This lowers the precision of the bridge circuit to lower the sensitiveness of the regulator circuit. The delay in the precision is only momentary and so serves to stabilize the regulating operation so as to prevent hunting action.

The two regulator tubes which are connected in parallel circuit relation have their output circuit directly connected to the regulating field winding of the motor. The regulator tubes serves to control the current flow through the regulating field winding so as to maintain the motor speed substantially constant with very close precision.

A potentiometer which is connected between the plates of the regulator tubes and ground is provided for impressing a potential on the second or compensating grid of the phase detector coplanar tube for stabilizing the regulating operation. A resistance element and a capacity element are shunted around a portion of the potentiometer in order to effect a slight time delay in the operation of the compensating action to prevent hunting action by the regulator. The compensation supplied to the regulator by the potential impressed upon the compensating grid of the coplanar tube serves to compensate the regulating operation for variations in load.

In the regulator system employed to describe the invention the plate battery for the various space discharge devices is not isolated and the regulating field winding of the motor is at a positive potential with respect to the cathodes of the various space discharge devices. In order to compensate the regulating operation for load changes in such a system, it is necessary to impress a positive potential on a grid of the detector tube. Accordingly the grid upon which the positive compensating potential is impressed will draw current. If the compensating potential were impressed on the control grid of the phase detector tube, the tube would have a low input impedance and the current due to the low input impedance of the tube would degrade the action of the frequency sensitive bridge. This action would interfere with the sensitivity of the regulator. According to the invention a coplanar tube is provided as the phase detector tube so that the bridge circuit is connected to a negatively biased grid and the compensating circuit is connected to an independent grid which may have a positive potential impressed thereon. The employing of a coplanar phase detector tube with two separate grid elements avoids the degradation of the action of the frequency sensitive bridge of low power output capacity. The grid current drawn by the compensating grid is small compared to the power supplied to the regulating field winding and does not interfere with the regulating operation.

The single figure in the accompanying drawing is a diagrammatic view of a regulator system constructed in accordance with the invention.

Referring to the drawing, motor 1 which comprises an armature 2, a regulating field winding 4 and a shunt field winding 3 is operated by means of a battery or source of power 5. An alternating current generator 9 of the inductor type is preferably directly connected to the motor 1. The generator 9 comprises an armature winding 10 and a field winding 11. The field winding 11 is connected to a battery 13 through the battery 5 which opposes the potential of the battery 13. The armature winding 10 of the generator is connected by a transformer 14 to the input circuit of an amplifier tube 15 having a limited power output.

The output circuit of the amplifier tube 15 is connected by a transformer 28 to two opposite vertices of a Wheatstone bridge circuit 21 and by a transformer 34 to the plate circuit of a phase detector tube 22. The Wheatstone bridge circuit comprises a resistance arm 25, two arms 26 and 27 which form the secondary winding of the transformer 28 and a resonant arm 29. The resonant arm 29 comprises an inductance element 30 and a capacity element 31 which are tuned to the frequency of the generator 9 when the motor 1 is operated at normal speed. The primary winding 32 of the transformer 28 is connected to the output circuit of the amplifier tube 15 in parallel relation with the primary winding 33 of the transformer 34. The secondary winding 41 of the transformer 34 supplies alternating plate potential to the phase detector tube 22.

The phase detector tube 22 comprises a cathode 38, an anode 39, a control grid 37 and a compensating grid 7. The input circuit of the phase detector tube 22 comprising the control grid 37 is connected to two opposite vertices of the Wheatstone bridge circuit 21 by means of the transformer 40.

The plate 39 of the phase detector tube 22 has an alternating potential impressed thereon from the amplifier tube 15 of limited power output and the control grid 37 of the phase detector tube has alternating potential impressed thereon from the Wheatstone bridge circuit 21. The potential impressed upon the control grid of the phase detector 22 from the Wheatstone bridge circuit varies in phase and amplitude with respect to the alternating potential impressed upon the plate of the phase detector tube according to the frequency of the current produced by the pilot generator 9 and in accordance with the speed of the motor 1. The output from the phase detector tube 22 varies according to the phase relation between the alternating potentials impressed upon the control grid and the anode 39. A detailed description of the operation of the Wheatstone bridge circuit in combination with the phase detector tube is set forth in the above mentioned patent of E. R. Morton No. 1,788,733 and further description thereof is deemed unnecessary.

Two regulator amplifier tubes 23 and 24 are connected in parallel circuit relation between the phase detector tube 22 and the motor regulator field winding 4. The input circuits of the two regulator tubes 23 and 24 are coupled to the phase detector tube 22 by means of a coupling resistance 51. A positive potential with respect to the potentials on the filaments of the regulator tubes is impressed on the grids of such tubes from the source of current 5. Plate potential for the regulator tubes 23 and 24 is provided by a source 36. The source 36 also supplies plate potential to the amplifier tube 15 of limited power output. Heating current for the filaments of all tubes in the system is supplied by the battery 5. Grid bias for the amplifier tube 15 is obtained across the resistance elements 8 and 20. A condenser 12 is connected to the resistance element 8 to provide a low impedance path for alternating potentials.

A condenser 53 is shunted across the coupling resistance 51 in order to stabilize the regulating operation and prevent hunting action. The condenser 53 may be said to effect delayed precision in the operation of the regulator system or to reduce the corrective force in magnitude for a short time. The bridge circuit 21 and the phase detector plate 39 are supplied with potential from the same source, namely the amplifier tube 15 which has a very limited power output. Accordingly, when the phase detector tube draws current to charge the condenser 53 across the coupling resistance 51 the voltage condition on the grid circuit is momentarily changed to delay the corrective force of the regulator circuits for a sufficient time to prevent the regulator from hunting.

If the motor 1 tends to increase in speed the generator 9 is operated to raise the frequency of the generated current. The Wheatstone bridge 21 varies the phase relation of the potential impressed upon the grid 37 of the phase detector tube 22 with respect to the potential impressed upon the plate 39 of such tube to lower the output from the phase detector tube. The potential drop across the coupling resistance 51 is lowered to increase the output from the regulator amplifier tubes 23 and 24. The increased output from the regulator tubes increases the current flow through the regulating field winding 4 to oppose increase in the motor speed. When the output from the phase detector tube 22 changes the condenser 53 is charged to load the amplifier 15 and momentarily reduce the inherent precision of the bridge circuit 21 to prevent the regulating operation overshooting or hunting.

If the speed of the motor 1 tends to decrease an opposite operation as above set forth takes place. A reduction in the speed of the motor 1 reduces the frequency of the current produced by the pilot generator 9. The variation in the frequency of the current produced by the generator 9 controls the Wheatstone bridge circuit to effect a difference in the phase relation between the potentials on the control grid and the plate of the phase detector tube 22 so as to increase the output from the phase detector tube. The increased drop across the coupling resistance 51 increases the negative potential from the coupling resistance 51 which is impressed on the grids of the regulator tubes 23 and 24. The output from the regulator tubes 23 and 24 is reduced to reduce the excitation of the motor regulating field winding 24 and, accordingly, to prevent lowering of the motor speed.

Grid biasing potential for the phase detector tube 22 and the regulator tubes 23 and 24 is obtained from the source 5 to compensate for the changes in voltage supplied to the motor 1. The grid 37 of the phase detector tube 22 receives a negative bias with respect to the potential on the cathode 38 from the source 5, whereas the grids of the regulator tubes receive a positive potential with respect to the potentials on the filaments of the regulator tubes from the source 5. A change in the voltage of the source 5 tends to change the regulating field winding 11 by changing the initial positive bias on the grids of the regulator tubes 23 and 24 and the negative bias on the control grid of the phase detector tube 22. The changes in the grid bias on the phase detector tube 22 and the regulator tubes 23 and 24 tend to change the regulating field winding 4 of the motor so as to compensate for the changes in the voltage of the power supplied to the motor.

A potentiometer comprising resistance elements 57 and 58 is connected between the plates of the regulator tubes 23 and 24 and ground. A resistance element 56 and a condenser 59 are connected around the resistance element 58 of the potentiometer and the compensating grid 7 of the phase detector tube 22 is connected to the junction point of the resistance element 56 and the condenser 59. The potentiometer comprising the resistance elements 57 and 58 serves to impress a positive potential on the compensating grid 7 of the phase detector tube 22 so as to compensate the regulating operation for changes in load on the motor 1. The resistance 56 and the capacity element 59 serve to effect a time lag in the operation of the compensating means so as to insure against any hunting action. The potential impressed upon the compensating grid 7 of the phase detector tube 22 may be said to vary in accordance with the current flow of the regulating field winding 4 of the motor 1 or according to the conductivity of the regulator tubes.

If the regulator tubes 23 and 24 are operated with a strong negative bias on the grids thereof which is caused by a tendency of a motor to operate at reduced speed, it is apparent that the plates of the regulator tubes will be substantially the potential of the positive terminal of the battery 36. This is apparent since the current passed by the regulator tubes is small and there is consequently a small resistance drop in the regulating field winding 4. A suitable portion of the comparatively high potential drop across the resistance elements 57 and 58 of the potentiometer is supplied through the resistance 56 to the auxiliary compensating grid 7 of the phase detector tube 22. This positive potential impressed upon the compensating grid 7 of the phase detector tube increases the conductivity of the phase detector tube to increase the resistance drop across the coupling resistance 51. The increased drop across the coupling resistance 51 increases the negative potential on the grids of the regulator tubes 23 and 24 and consequently increases the impedance of the regulator tubes to an extent greater than would be found due to the action of the speed sensitive elements of the regulator.

If the regulator tubes 23 and 24 have high conductivity caused by a tendency of the motor to increase in speed, the potential drop across the potentiometer comprising the resistance elements 57 and 58 is reduced to reduce the positive potential impressed on the compensating grid 7 of the phase detector tube 22. The reduction in the positive potential impressed on the compensating grid 7 reduces the conductivity of the phase detector tube and reduces the potential drop across the coupling resistance 51. The reduction in the potential drop across the coupling resistance 51 reduces the negative potential impressed on the grids of the regulator tubes 23 and 24. This further reduces the impedance of the regulator tubes 23 and 24 to produce a compensating effect. As above set forth a delay is introduced by the resistance element 56 and the condenser 59 to prevent hunting action.

Modifications in the system and in the arrangement and location of parts may be made within the spirit and scope of the invention and such modifications are intended to be covered by the appended claims.

What is claimed is:

1. In a regulator system, a dynamo-electric machine having a regulating field winding, a space discharge device having a control grid and a compensating grid, means for governing said control grid to govern the excitation of said regulating field winding to maintain a characteristic of the machine constant, and means for applying potential varying according to the regulating operation to said compensating grid to compensate the regulating operation.

2. In a regulator system, a motor having a regulating field winding, a space discharge device having a control grid and a compensating grid, means for governing said control grid to control the excitation of said regulating field winding to maintain the motor speed substantially constant, and means for applying potential to said compensating grid to compensate the regulating operation.

3. In a regulator system, a motor having a regulating field winding, a detector tube having a control grid and a compensating grid, means for governing said control grid to control the excitation of said regulating field winding and maintain the motor speed substantially constant, and means for impressing a potential on the compensating grid of the tube according to the current flow through the regulating field winding to compensate the regulating operation.

4. In a regulator system, a regulator circuit, a space discharge device having a control grid and a compensating grid, means for controlling said control grid to govern said circuit to maintain an electrical characteristic thereof substantially constant, and means for applying potential varying according to the regulating operation to said compensating grid to compensate the regulating operation.

5. In a regulator system, a regulated circuit, a space discharge device having a control grid and a compensating grid, means for controlling said control grid to govern said circuit to maintain an electrical characteristic thereof substantially constant, auxiliary means for applying potential to said compensating grid to compensate the regulating operation, and means for effecting a time delay in the application of said auxiliary means to prevent hunting action.

6. In a regulator system, a motor having a regulating field winding, means comprising a detector tube for controlling the excitation of said regulating field winding to maintain the speed of the motor substantially constant, said detector tube comprising a cathode, an anode, a control grid and a compensating grid, and means for applying a potential to said compensating grid to compensate the regulating operation for load changes.

7. In a regulator system, a motor having a regulating field winding, a space discharge device having a control grid and a compensating grid, a regulator tube for governing the excitation of said field winding, means for governing said control grid to govern said regulator tube and maintain the motor speed substantially constant, and means for impressing a potential on said compensating grid according to the conductivity of said regulator tube to compensate the regulating operation according to the load on the motor.

8. In a regulator system, a motor having a regulating field winding, a regulator tube for governing the excitation of said field winding, a detector tube having a control grid and a compensating grid, means for governing said control grid according to the motor speed to control said regulator tube and maintain the motor speed substantially constant, and means for impressing a potential on the compensating grid according to the conductivity of said regulator tube to compensate the regulating operation.

9. In a regulator system, a motor having a regulating field winding, a regulator tube for governing the excitation of said field winding, a detector tube having a control grid and a compensating grid, means for governing said control grid according to the motor speed to control said regulator tube and maintain the motor speed substantially constant, means for impressing a potential on the compensating grid according to the conductivity of said regulator tube to compensate the regulating operation, and means for effecting a time delay in the application of said compensating means to prevent hunting action.

10. In a regulator system, a dynamo-electric machine having a regulating field winding, a space discharge device having a control grid and a compensating grid, means to control said control grid to control the excitation of said regulating field winding to maintain a characteristic of the machine constant, auxiliary means for applying potential to said compensating grid to compensate the regulating operation and means for effecting a time delay in the application of said auxiliary means to prevent hunting action.

11. In a regulator system, a motor having a regulating field winding, a source of alternating current having a frequency varying according to the speed of said motor, frequency sensitive means connected to said source of alternating current, a detector tube having a control grid governed by said frequency sensitive means, means operated by said detector tube for controlling the excitation of said regulating field winding to maintain the motor speed constant, a compensating grid for said detector tube, and means for applying a potential to said compensating grid to compensate the regulating operation according to the current in the regulating field winding.

12. In a regulator system, a motor having a regulating field winding, a source of alternating current having a frequency varying according to the motor speed, a detector tube having a control grid and a compensating grid, a regulator tube for governing the excitation of said field winding, frequency sensitive means for governing the control grid of said detector tube according to the frequency of said source, means comprising said detector tube for governing said regulator tube to maintain the motor speed constant, and means comprising a potentiometer connected across the output circuit of said regulator tube for impressing a potential on said compensating grid to compensate the regulating operation.

13. In a regulator system, a motor having a regulating field winding, a regulator tube for governing the excitation of said field winding, a detector tube having a control grid and a compensating grid, means for governing said control grid according to the motor speed to control said regulator tube and maintain the motor speed substantially constant, and means comprising a potentiometer connected across the output circuit of said regulator tube for impressing a potential on said compensating grid to compensate the regulating operation.

14. In a regulator system, a motor having a regulating field winding, a regulator tube for governing the excitation of said field winding, a detector tube having a control grid and a compensating grid, means for governing said control grid according to the motor speed to control said regulator tube and maintain the motor speed substantially constant, means comprising a potentiometer connected across the output circuit of said regulator tube for impressing a potential on said compensating grid to compensate the regulating operation, and means comprising a resistance element and a condenser shunted across a portion of said potentiometer for effecting a delay in said compensating means to prevent hunting action.

15. In a regulator system, a motor having a regulating field winding, a phase detector tube comprising a cathode, an anode, a control grid and a compensating grid, a source of alternating current having a frequency varying according to the motor speed, a Wheatstone bridge circuit having one arm tuned to the normal frequency of said source, means for connecting said source to two opposite vertices of said bridge and to the anode of said detector tube, means for impressing alternating potential from said bridge on the control grid which varies in phase with respect to the potential on the anode according to the variations in frequency of said source, means controlled by said detector tube to maintain the motor speed substantially constant, and means for impressing a potential on the compensating grid to compensate the regulating operation according to the load on the motor.

16. In a regulator system, a dynamo-electric machine having a regulating field winding, a space discharge device having a plurality of control electrodes, and means for impressing a control potential varying according to a characteristic of the machine on one of said control electrodes and a control potential varying according to the regulating operation on the other control electrode to produce a combined effect in the output of said device for governing the excitation of said regulating field winding.

EDMUND R. MORTON.